US008276266B2

(12) United States Patent
Pedraza Sanz

(10) Patent No.: US 8,276,266 B2
(45) Date of Patent: Oct. 2, 2012

(54) SEMI-AUTOMATIC SYSTEM FOR THE MANUFACTURE OF ELECTRICAL INDUCTION COILS

(75) Inventor: Juan Manuel Pedraza Sanz, Cordoba (ES)

(73) Assignee: Asea Brown Boveri, S.A. (ES)

( * ) Notice: Subject to any disclaimer, the term of this patent is extended or adjusted under 35 U.S.C. 154(b) by 151 days.

(21) Appl. No.: 10/599,716

(22) PCT Filed: Sep. 26, 2005

(86) PCT No.: PCT/ES2005/000518

§ 371 (c)(1), (2), (4) Date: Oct. 6, 2006

(87) PCT Pub. No.: WO2006/040375

PCT Pub. Date: Apr. 20, 2006

(65) Prior Publication Data

US 2007/0215739 A1 Sep. 20, 2007

(30) Foreign Application Priority Data

Oct. 8, 2004 (ES) .................................. 200402464

(51) Int. Cl.
*B23P 19/00* (2006.01)
*H01F 7/06* (2006.01)

(52) U.S. Cl. ........................................... 29/745; 29/605

(58) Field of Classification Search .................... 29/745, 29/729, 605, 606; 336/15, 192; 242/437, 242/439, 439.2, 439.4, 440, 443

See application file for complete search history.

(56) References Cited

U.S. PATENT DOCUMENTS

| | | | | |
|---|---|---|---|---|
| 3,495,202 | A * | 2/1970 | Parker | 336/186 |
| 3,911,332 | A * | 10/1975 | Kunkel | 361/270 |
| 5,198,737 | A * | 3/1993 | Harima et al. | 318/568.11 |
| 5,581,220 | A * | 12/1996 | Rodenbush et al. | 335/216 |
| 5,604,473 | A * | 2/1997 | Rodenbush | 335/216 |
| 5,644,486 | A * | 7/1997 | Chang et al. | 700/3 |
| 6,910,360 | B2 * | 6/2005 | Stjepan et al. | 72/140 |

FOREIGN PATENT DOCUMENTS

| | | |
|---|---|---|
| DE | 2530312 | * 7/1975 |
| DE | 2530312 | * 1/1977 |
| JP | 11-345732 | * 12/1999 |
| JP | 11345732 | * 12/1999 |
| JP | H11-345732 | * 12/1999 |

* cited by examiner

*Primary Examiner* — David Angwin

(57) ABSTRACT

A system for the manufacture of electrical coils. The system includes a control unit configured to receive measurements for the electrical coil. The system further includes a pressure head operably connected to the control unit and mounted on a support, the pressure head including a vertical axle and a horizontal axle. At least one vertical wheel is mounted on the vertical axle and positioned to accept a conductor material and regulate height and flatness in the coil being formed. At least one horizontal wheel is mounted on the horizontal axle and positioned to accept the conductor material and position the conductor material on top of a previously formed coil. At least one hydraulic cylinder is attached to the vertical and horizontal axles and configured to adjust coiling pressure exerted on the conductor material by adjusting hydraulic pressure on the axles.

7 Claims, 2 Drawing Sheets

SEMI-AUTOMATIC SYSTEM FOR THE MANUFACTURE OF ELECTRICAL INDUCTION COILS

CROSS REFERENCE TO RELATED APPLICATIONS

This application is a U.S. national phase of international application No. PCT/ES2005/000518, filed Sep. 26, 2005, which claims the benefit of priority to ES application 200402464, filed on Oct. 8, 2004.

OBJECT OF THE INVENTION

The present specification relates to a semi-automatic system for the manufacture of large electrical induction coils, a table for the manufacture of coils which is worked on by means of an articulated head that exerts the necessary pressure on each of the turns in the coil and is aided by a system that tightens and feeds the conductor. All this is in turn controlled by a remote programmed system wherein which the relevant orders are entered for the characteristics of the coils to be manufactured.

The evident usefulness of the invention lies in the fact that it considerably improves the current manufacturing procedure, making the manufacturing cycle much shorter since it removes the need for jobs such as pressing the coils, therefore achieving greater precision in the size of coil required.

Moreover, the use of this process regulates and controls the mechanical tension of the conductor, avoiding the risk of it becoming streched or distorted and thus producing better quality coils.

FIELD OF THE INVENTION

The field of application of the present invention is in the manufacture of coils for engines and electrical transformers, more specifically for large equipment and particularly for systems using high electrical voltage.

BACKGROUND OF THE INVENTION

The manufacture of induction coils for large electrical equipment has a number of complications deriving from both the materials used and the size thereof, meaning that the construction and assembly process basically has to be carried out by hand.

The shape of the coil must be established right from the beginning and the conductor must be adapted so that it has the right number of turns and the right number of turns in each layer in order to fulfil the characteristics required of it for the equipment into which it will be fitted.

As there is usually a great deal of tension on the conductor, it suffers distortions that result in the misshaping of the coil. Likewise, the position of each turn requires adjustments using hand tools, mallets, wedges, etc., meaning that the procedure is purely manual.

There is no known system similar to the one that the invention proposes, which is capable of avoiding the process of laying out the coil and adjusting each of the turns, by substituting the most laborious manual techniques in this type of coiling for large equipment that is usually for high-voltage systems.

SUMMARY

The semi-automatic system for the manufacture of large electrical induction coils that the invention proposes comprises a coiling table, an articulated head with a double pressure system, automatic equipment for feeding the cable, the set of reels of conductor to be coiled and a programmable control panel.

The coiling table comprises a board whereon the buffers and moulds are situated, being adapted for the size of coil to be manufactured. This table enables the coil to be lifted, once finished, by means of a set of strips fitted to the table that are moved by a hydraulic pressure system. The manual clamping tools are positioned so as to keep the coil in its final dimensions. Once this operation has been carried out, the coil is lifted from the table to pass on to the next process, "dressing the coils," where the layers are joined together so that they maintain their shape, making the coil more rigid for subsequent handling.

The system's head is mounted on a revolving arm that is fastened to a vertical support which is fixed to the floor. At the end that works on the table and conductor it has two sets of axles/wheels that work in coordination to form the coils made from the conductor.

The hydraulic pressure wheel with a vertical axle is for guaranteeing the correct length of the cables entering during the coiling process, applying pressure in order to keep the rectangular shape and rounded corners of these coils. The material of which this wheel is made is a technical plastic in order to avoid damaging the paper that covers the copper conductors to insulate them on each layer formed by the turns of the coil. The degree to which the wheel presses on the cables is regulated by a hydraulic cylinder joined by its ends to the revolving arm and the vertical support, and connected to a hydraulic oil mechanism that is capable of maintaining uniform pressure regardless of the position of the arm.

The set of pneumatic pressure wheels with a horizontal axle works to keep the coil flat, and it has a means of regulating the pneumatic pressure cylinders.

The action of both these sets of wheels makes the head press and form each of the turns, in addition to recording each of them as they enter the coil so that the real size of the coil is known whilst manufacturing, by measuring the position of the pressing wheel and comparing it with the theoretical value that it should have. Thus, by following previously programmed objective criteria the system may either stop the process in order for the operator to carry out any necessary work on the coil or simply inform the operator dimensional deviation thereof from the theoretical values. In order to get closer to said values, the operator may stop the coiling process in order to manually insert padding and therefore achieve the final theoretical size.

The automatic cable feeder is a set of clamps fitted on a rail so that it follows the movement of the machine as the cables enter and this means that it always forms a tangent to the head's hydraulic pressure wheel.

The control system comprises an automatic device with a touch screen interface and a manual control panel in order to ensure the safety of the machine operators. The automatic device continuously controls all the functions of the system, the turning of the coiling table, the pushing of the head mechanism, the movement of the revolving arm and the position of the feeder. It is possible to import text files by computer containing input data (information about the coil to be manufactured and the system parameters for controlling said manufacture) and export output data (information about the process) using the local network. The output data that is recorded includes: real dimensions of the finished coils; coiling time; times of programmed stops; set up times for the winding table; and alarms. This thus allows links to be established between processes.

DESCRIPTION OF THE DRAWINGS

To complement the description being made and with the object of aiding towards a better understanding of the invention's characteristics, two pages are attached that show illustrative, non-limiting plans integral to the present specification showing the following.

PREFERRED EMBODIMENT OF THE INVENTION

In view of these figures, the outer appeareance and other characteristics of the invention can be seen.

Figure 1:
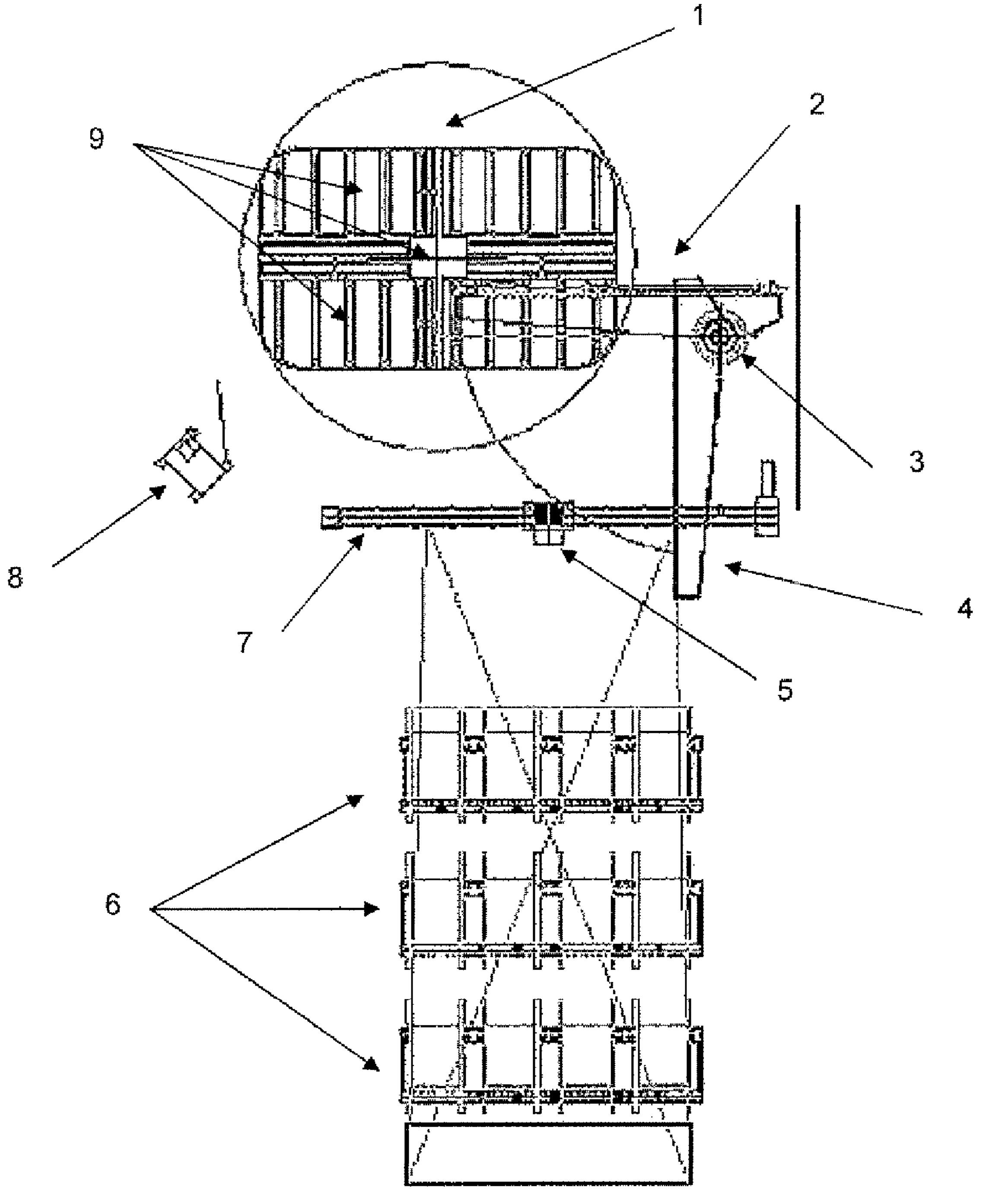
FIG. 1 shows a diagram of the layout and components of the semi-automatic system for the manufacture of large electrical induction coils.

FIG. 1 shows the layout of the different components of the semi-automatic system for the manufacture of large electrical induction coils. There is an area where the different conductor reels 6 to feed the coil are arranged. The conductor to be coiled leaves the reels and is guided along the automatic feeder 5 which is mounted on a rail 7.

From the feeder 5, the conductor moves towards the pressure head 2 in such a way that the wire forms a tangent to the adjustment wheels of the head. The head is fitted onto an arm that is shown in the figure in its working position 2 and its resting position 4. The change from one to the other is made by rotating on the support 3, so that the end is left free for working on the coiling table 1.

The table 1 consists of a board whereon the buffers and moulds are situated, being adapted for the size of coil to be manufactured. This table enables the coil to be lifted, once finished, by means of a set of strips 9 fitted to the table that are moved by a hydraulic pressure system.

The whole system is controlled by a control unit (8) which is provided with the measurements referring to number of turns of the coil in process; coiling time; times of programmed stops; set up times for the winding table, and alarms.

It also has the real position of the pressure head 2 which it compares with the theoretical position of the coil at all times in its development, stopping the process when the difference requires manual padding.

Figure 2:
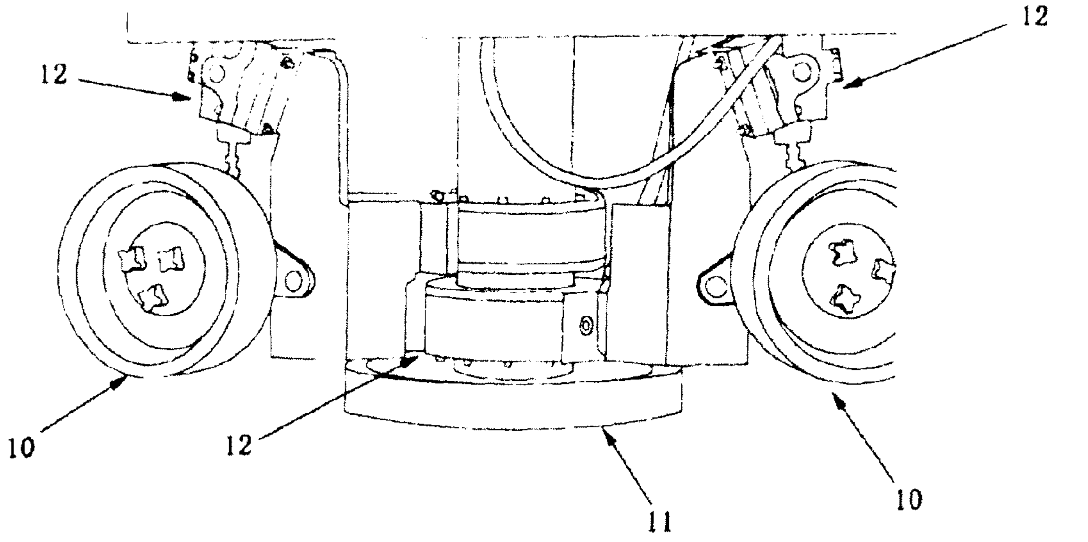
FIG. 2 shows a detail of the pressure head.

The head shown in detail in FIG. 2 is for positioning the turns of the conductor. To do this it has vertical pressure wheels 10 that regulate the height and ensure that each layer of the coil is flat. Said wheels maintain their pressure according to how their respective pneumatic systems 12 are programmed. In order to ensure that the set of cables entering the coil is in contact with the vertical wheels at all times, these wheels have two auxiliary horizontal discs attached to them which maintain contact with said entering cables.

The head has a horizontal pressure wheel 11 which presses against the conductor, which forms the turn on top of the layer immediately before, so that the exact shape of the coil is achieved. The pressure with which this wheel carries out its job is regulated by a hydraulic cylinder 12.

Figure 3:
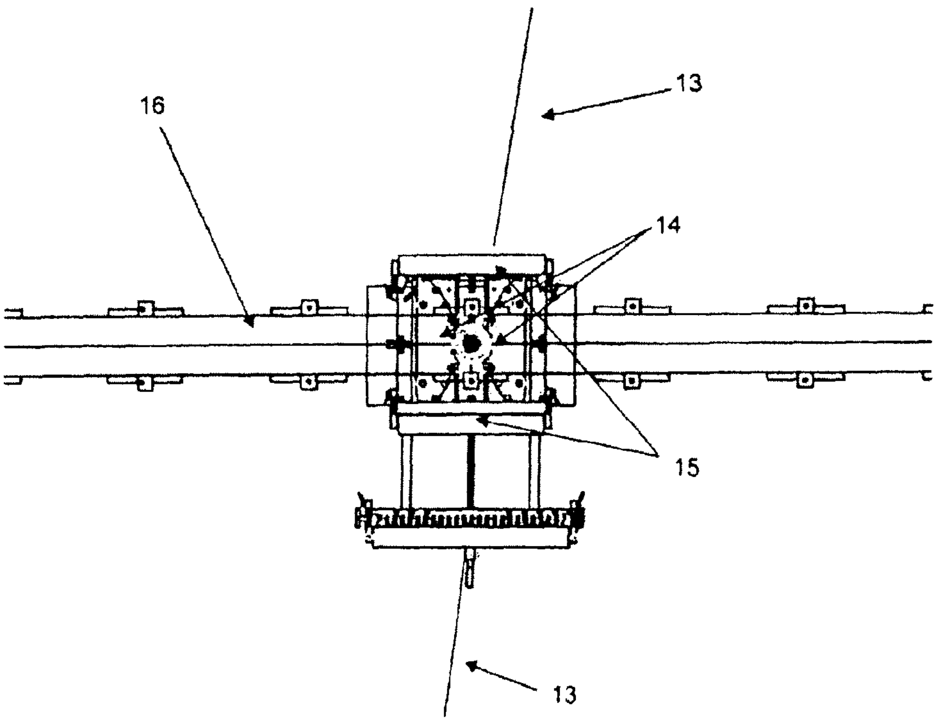
FIG. 3 shows the layout whereby the automatic cable feed operates.

To help maintain the tension of the conductor and the predetermined angle at which it enters the coiling process, there is a cable feeder that is shown in FIG. 3. In said figure a conductor 13 can be seen, which is received by the rear rollers of the feeder and lead along a system of clamps 14 to the exit rollers 15 in order to, from there, end in such a way that they form a tangent to the horizontal wheel of the pressure head.

The feeder is mounted on a rail 16, which allows the conductor to leave it in the way required for it to be coiled, as has been mentioned above.

It is not considered necessary for this description to be any fuller for someone skilled in the art to understand the scope of the invention and the advantages derived therefrom. The materials, shape, size and layout of the parts may vary, as long as they do not fundamentally alter the invention. The terms in which this description has been made must be taken in a broad, non-limiting sense.

The invention claimed is:

1. A semi-automatic system for the manufacture of large electrical induction coils, comprising:

a control unit configured to receive measurements related to an electrical induction coil to be formed;

a pressure head operably connected to the control unit and mounted on a support on which the pressure head pivots between a resting position and a working position, wherein a size of the coil to be formed is known by the control unit during manufacture based upon a comparison by the control unit of a real position of at least a portion of the pressure head against a theoretical position of the at least a portion of the pressure head as determined by the control unit from the measurements, the pressure head having a vertical axle and a horizontal axle;

at least one vertical wheel mounted on the vertical axle and positioned to accept a conductor material and regulate height and flatness in a coil formed in the conductor material, wherein the at least one vertical wheel comprises at least one auxiliary horizontal disc positioned such that when the conductor material is fed into the pressure head the conductor material maintains contact with the at least one vertical wheel;

at least one horizontal wheel mounted on the horizontal axle positioned to accept the conductor material and position the conductor material on top of a previously formed coil;

at least one hydraulic cylinder attached to the vertical and horizontal axles, the hydraulic cylinder operably connected to the control unit and configured to adjust coiling pressure exerted on the conductor material by adjusting hydraulic pressure on the axles; and a conductor feeder mounted on the support, the feeder comprising a set of clamps such that the conductor to be coiled is positioned tangent to the vertical and horizontal wheels, thus eliminating traction tensions in the conductor as well as a risk of stretching the conductor during coiling.

2. The system of claim 1, wherein the control unit transmits commands to the hydraulic cylinder to maintain the coiling pressure on the vertical and horizontal axles according to an acceptable pressure threshold.

3. The system of claim 2, wherein the control unit determines the commands to transmit based upon a shape of a coil to be manufactured, a number of turns of a coil to be manufactured and any programmed stops for manual work on the coil.

4. The system of claim 1, wherein the control unit further comprises a user interface having an input device.

5. The system of claim 1, wherein the control unit further comprises an input/output interface for operably connecting to a communications network.

6. The system of claim 2, wherein the control unit outputs data via the communications network, the data including at least one of dimensions of finished coils, coiling time, programmed stop time, set up time, and any alarms.

7. A semi-automatic system for the manufacture of large electrical induction coils, comprising:

a control unit configured to receive measurements related to an electrical induction coil to be formed;

a pressure head operably connected to the control unit and mounted on a revolving arm about which the pressure head pivots between a resting position and a working position in response to a command from the control unit, wherein a size of the coil to be formed is known by the control unit during manufacture based upon a comparison by the control unit of a real position of at least a portion of the pressure head against a theoretical position of the at least a portion of the pressure head as determined by the control unit from the measurements, the pressure head having a plurality of vertical axles and a plurality of horizontal axles;

at least one hydraulic cylinder attached to the plurality of vertical and horizontal axles, the hydraulic cylinder operably connected to the control unit and configured to adjust coiling pressure exerted on the conductor material by adjusting hydraulic pressure on the plurality of vertical axles and the plurality of horizontal axles;

at least one vertical wheel mounted on each of the plurality of vertical axles and positioned to accept a conductor material and regulate height and flatness in a coil formed in the conductor material, wherein the at least one vertical wheel comprises a plurality of auxiliary horizontal discs positioned such that when the conductor material is fed into the pressure head the conductor material maintains contact with the at least one vertical wheel;

at least one horizontal wheel mounted on each of the plurality of horizontal axles and positioned to accept the conductor material and position the conductor material on top of a previously formed coil;

a conductor feeder mounted on the support, the feeder comprising a set of clamps such that the conductor to be coiled is positioned tangent to the vertical and horizontal wheels, thus eliminating traction tensions in the conductor as well as a risk of stretching the conductor during coiling.

* * * * *